United States Patent [19]

Wozniak

[11] 4,210,959
[45] Jul. 1, 1980

[54] CONTROLLER FOR MAGNETIC DISC, RECORDER, OR THE LIKE

[75] Inventor: Stephen G. Wozniak, San Jose, Calif.

[73] Assignee: Apple Computer, Inc., Cupertino, Calif.

[21] Appl. No.: 904,420

[22] Filed: May 10, 1978

[51] Int. Cl.² .......................... G06F 13/08; G06F 3/06
[52] U.S. Cl. ........................................ 364/200; 360/78
[58] Field of Search ... 364/200 MS File, 900 MS File, 364/200, 900; 360/69, 71, 78, 135

[56] References Cited

U.S. PATENT DOCUMENTS

| | | | |
|---|---|---|---|
| 3,668,647 | 6/1972 | Evangelista | 364/200 |
| 3,909,800 | 9/1975 | Recks et al. | 364/200 |
| 3,987,419 | 10/1976 | Morrill et al. | 364/200 |
| 3,990,055 | 11/1976 | Henderson et al. | 364/200 |
| 4,080,651 | 3/1978 | Cronshaw et al. | 364/200 |
| 4,096,579 | 6/1978 | Black et al. | 364/900 |
| 4,100,601 | 7/1978 | Kaufman et al. | 364/200 |
| 4,148,098 | 4/1979 | McCreight et al. | 364/200 |

*Primary Examiner*—Mark E. Nusbaum
*Attorney, Agent, or Firm*—Blakely, Sokoloff, Taylor & Zafman

[57] ABSTRACT

A controller for interfacing between a digital computer and a magnetic disc recorder, such as a "floppy" disc, or other recorder or memory is disclosed. The controller, which permits accessing of the disc with minimum control by the computer, is realized with relatively few components and is particularly suited for interfacing between a microcomputer and a "minifloppy". Track selection with a computed velocity profile is employed. Synchronization with a soft sectored disc is achieved without additional hardware.

14 Claims, 6 Drawing Figures

CONTROLLER FOR MAGNETIC DISC, RECORDER, OR THE LIKE

BACKGROUND OF THE INVENTION

1. Field of the Invention

The invention relates to the field of controllers, particularly controllers for interfacing between a digital computer and a magnetic recorder such as a floppy disc or other memories.

2. Prior Art

Numerous controllers are commercially available for interfacing between digital computers and magnetic disc recorders such as the commonly employed floppy disc recorders. These discs include a plurality of endless, concentric tracks used for storing digital data. The controller typically accepts data in parallel form from the computer and provides the data in serial form to the recorder. Serialized data from the recorder is converted to parallel form for the computer. Controllers perform other functions such as track selection and synchronization.

Commercially available controllers, particularly those for floppy disc recorders, are generally complex and expensive. Because of their cost, they do not lend themselves to the consumer field (e.g., hobby and home uses) or small business use. As will be seen, with the present invention a relatively simple, inexpensive controller is described which is suitable for consumer and small business applications. However, the principles employed in the described controller are applicable to larger, more elaborate systems.

Ofter disc controllers provide track selection signals to the recorder. These signals control a stepping motor which drives the read-write head to the desired track. If the motor is stepped from track-to-track, considerable time is lost in selecting non-adjacent tracks. In the prior art, complex means are used to allow the stepping motor to accelerate and decelerate to and from higher speeds when selecting tracks which are separated from one another by some distance. With the present invention, a computed velocity profile is easily implemented, thus allowing rapid selection of non-adjacent tracks.

When a track is selected, synchronization between the controller/computer and the data recorded on the track is necessary. In some cases, permanent markers, such as holes, are included with each track to provide a fixed reference point. In "soft-sectored" discs, permanent markers are not used. These discs provide wider flexibility since the user is able to format the disc to a particular application. Somewhat intricate hardware is used to provide synchronization with these soft-sectored discs. A method is described in this application which provides rapid synchronization for soft-sectored discs.

BRIEF DESCRIPTION OF THE INVENTION

An interfacing means for interfacing between a digital computer and a magnetic disc recorder, such as a floppy disc or other memories, is described. A serial/-parallel register is employed for communicating with the computer on the data bus. A logic means, which may be a read-only memory, receives input signals (addresses) and provides output signals in response thereto. The logic means is controlled by a timing means which received a synchronization signal from the computer. Output signals from the logic means are coupled to the register and to the timing means. Input signals to the logic means (address signals) are received from the timing means, recorder and resister. Thus, some of the output signals from the logic means are used as address signals for selecting the next output from the logic means.

A method is described for synchronizing an n-bit digital register from the recorder. A synchronization field which comprises a plurality of codes, each having n-bits of one binary state and at least one bit of the other binary state, is coupled to the register. The register is automatically reset each time a bit of the one binary state is moved into the $n^{th}$ stage of the register. With this synchronization field, the register automatically becomes synchronized with the codes and words.

DETAILED DESCRIPTION OF THE INVENTION

A controller for providing an interface between a digital computer and a magnetic disc recorder or other memory means is described. While the following description is directed towards a floppy disc recorder, the invented concepts may be employed with other memory means, particularly where data is recorded in serial form such as in a charge-coupled device (CCD), bubble memory, etc. In the following description, numerous specific details are set forth such as specific word lengths, etc., to provide a thorough understanding of the present invention. However, it will be obvious to one skilled in the art that the present invention may be practiced without these specific details. In other instances, well-known circuits have been shown in block diagram form in order not to obscure the present invention in unnecessary detail.

In the presently preferred embodiment, the described controller and method of synchronization are employed to provide an interface between a microcomputer and a minifloppy disc recorder. The controller is particularly suited for use in the consumer field such as for home, hobby or small business use. In particular, the presently preferred embodiment of the controller is employed to provide an interface between an APPLE-2 computer, manufactured by Apple Computer, Inc. of Cupertino, Calif. and a SHUGART drive, Part No. SA-400, SA-390 or equivalent.

Figure 1:
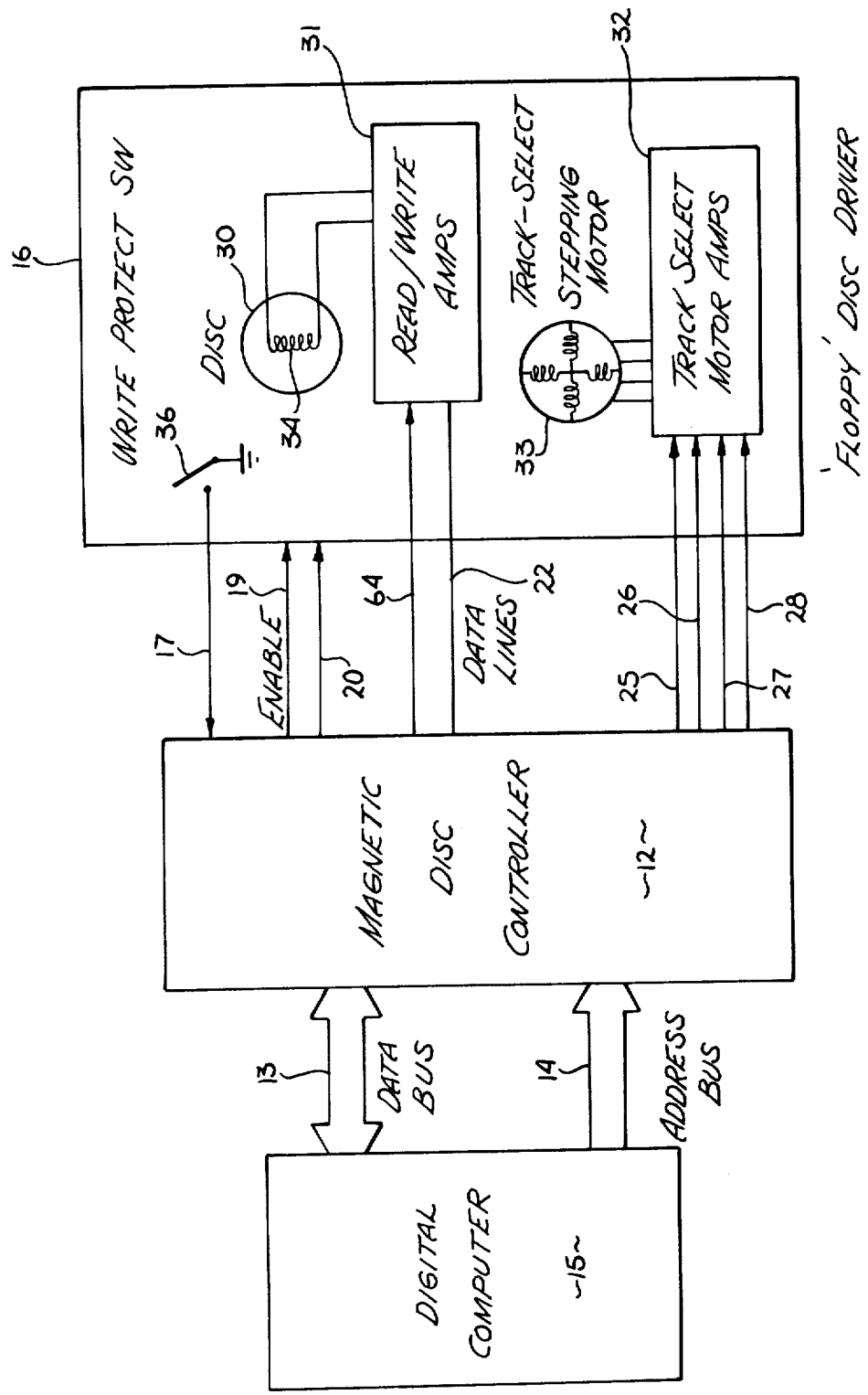
FIG. 1 illustrates the controller of the present invention interfacing between a digital computer and a disc driver (recorder).

Referring first to FIG. 1, the magnetic disc controller of the present invention, shown as controller 12, interfaces between a digital computer 15 and a disc driver 16. The digital computer 15 is coupled to the controller through a data bus 13 and through an address bus 14. The controller 12 is coupled to the driver 16 through a plurality of control and data lines. The selection of the track is controlled through the signals on lines 25, 26, 27 and 28, which are coupled to the four phases of the track-select stepping motor 33 through the track-select motor amplifiers 32. The motor 33 and amplifier 32 are ordinary components commonly employed in disc drivers.

A data signal for recording data onto the disc 30 is coupled to the driver 16 through a line 64 which communicates with the head 34 through the read/write amplifiers 31. Data read from the disc 30 is coupled through the amplifiers 31 to the controller 12 via line 22. The head 34 is moved by the stepping motor 33 to the desired track on the disc 30. Enabling signals to control the driver 16 are coupled to the driver from the controller 12 via lines 19 and 20. A write protect switch 36 couples a signal 17 to the controller 12 when there is an indication within the driver that the information on a particular disc is not to be erased. This is a common signal employed with numerous disc drivers.

Figure 6:
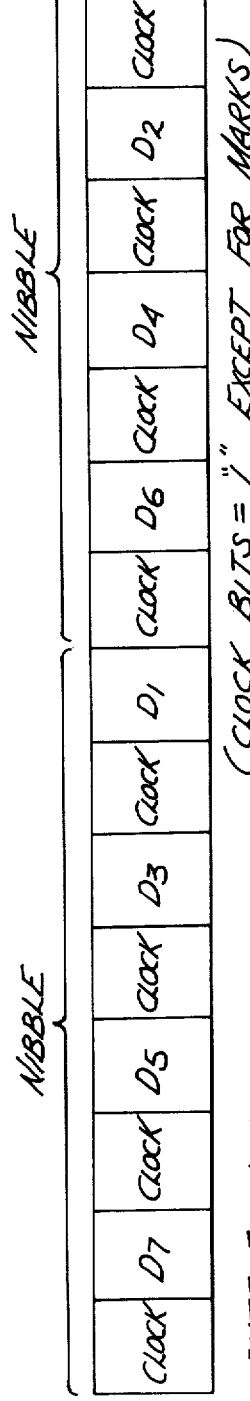
FIG. 6 is a graph illustrating the byte format employed in the presently preferred embodiment.

Before describing the controller in detail, the byte format employed in the presently preferred embodiment should be described since it will enable a better understanding of the controller. As shown in FIG. 6, the byte format consists of 8-bit nibbles. Each nibble consists of four data bits and four clock bits; two nibbles are required to store a byte of data. The clock bits are always binary ones. Thus, two consecutive binary zeros never occur in a normal data field; however, two consecutive binary zeros are employed for markers, as will be described. A nibble does not include either the more significant bits or the least significant bits; rather, the odd data bits, $D_1$, $D_3$, $D_5$ and $D_7$, are included in one nibble and the even data bits, $D_0$, $D_2$, $D_4$ and $D_6$, are included in the other nibble. By distributing the data bits in this manner, merging of the two nibbles into a standard byte is much easier. Note that if the nibbles are in parallel registers, a shift in one direction by one stage allows merger of the two nibbles into a single byte.

Figure 2:
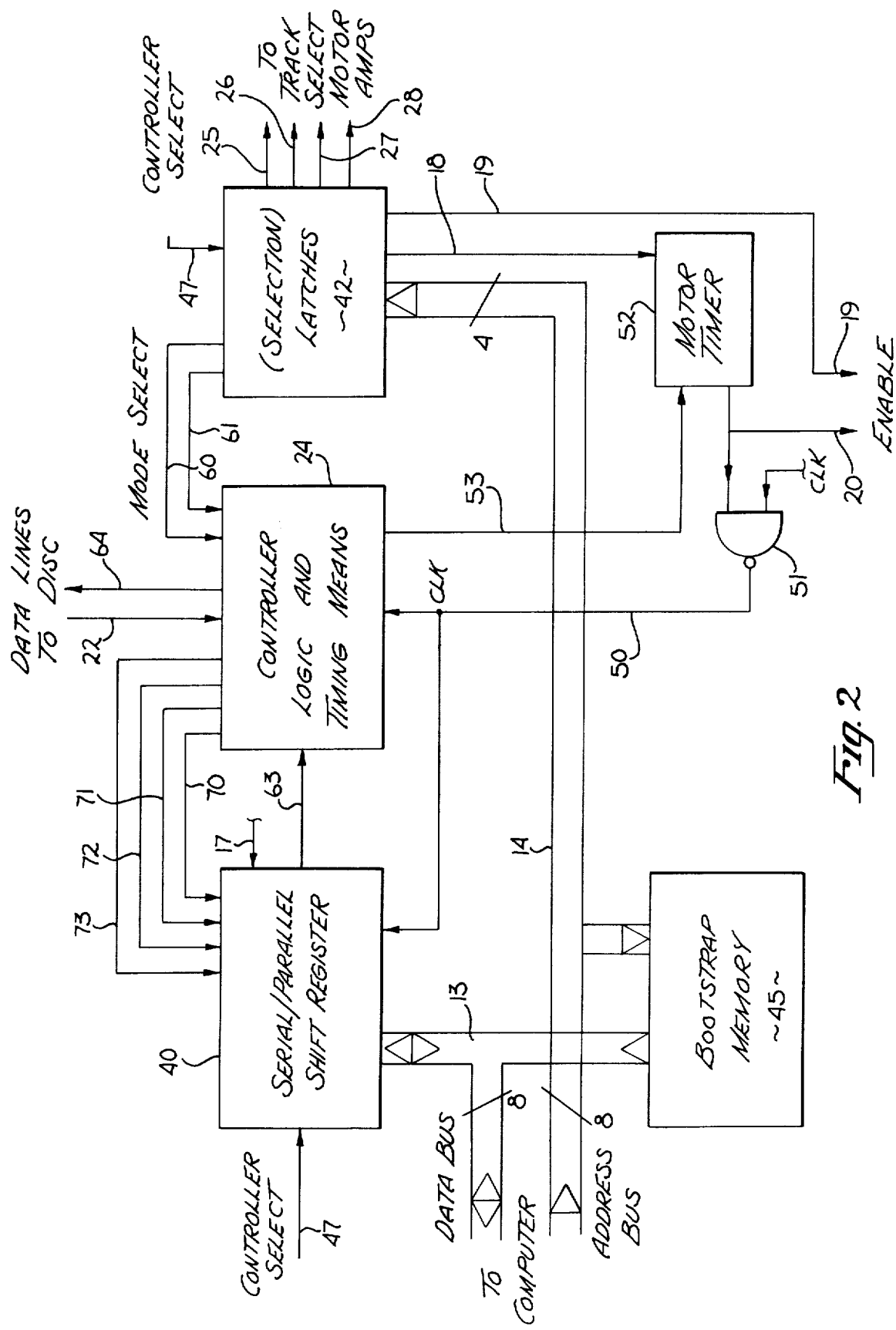
FIG. 2 is a block diagram of the controller of this present invention.

Referring now to FIG. 2, the main portions of the controller 12 of FIG. 1 comprise a serial/parallel shift register 40, a controller logic and timing means 24 and latches 42. The controller logic and timing means 24 is shown in its presently preferred embodiment in FIG. 3. The latches 42, which are ordinary digital latches, store data for selecting modes of operation, tracks on the disc and other control signals, as will be explained in greater detail. Also shown in FIG. 2 are a motor timer means 52 and a bootstrap memory 45.

The controller of FIG. 2, which is coupled to the computer via the data bus 13 and the address bus 14, receives a clocking signal at one input terminal of the NAND gate 51 from the computer. A controller-select signal on line 47 is coupled to the register 40 and latches 42 to indicate that the controller has been selected for operation by the computer. Other well-known control signals and lines such as those associated with power supplies are not shown in FIG. 2.

The controller of FIG. 2 is coupled to the recorder through the lines 25, 26, 27 and 28, which are also shown in FIG. 1. The enable signals on lines 19 and 20, the data lines 22 and 64, and the write protect switch signal on line 17 are also shown in FIG. 2.

The serial/parallel shift register 40 is an ordinary digital register for receiving 8-bit words, in parallel, from bus 13 and from shifting this data, serially, onto line 63 during the writing/reading mode. During the reading mode, data is serially shifted into the register 40 and then removed, in parallel, onto bus 13. The register 40 is controlled by signals coupled to the register on lines 70, 71, 72 and 73. These lines originate in the logic and timing means 24. During the reading mode, as will be described, the data shifted into the register is controlled by signals on these lines. During the reading mode, the register 40 is automatically cleared when its $n^{th}$ stage (8th stage) contains a binary one. Note that with the byte format of FIG. 6, the first bit of each nibble is always a binary one (clock bit). In the recording mode, data is shifted into the register 40 from right to left. The register 40 is also able to shift data from right to left; this is done, as will be described in greater detail, to sense the signal on line 17.

While in the presently preferred embodiment an 8-bit register 40 is employed, a 16-bit register or two 8-bit registers may be coupled in series to allow the transfer of 16-bit words to an appropriate bus.

The bootstrap memory 45, which is coupled to the address bus 14 and the data bus 13, may be a read-only memory such as a PROM. In the presently preferred embodiment, this optionally employed bootstrap memory is a 256-byte memory used to set initial conditions for operating the system software. The memory may be employed for the reading of operating systems from the disc, or like functions.

The controller logic and timing means 24 is able to sense if the disc is up to speed and provides a signal on line 53 so indicating. This signal through timer 52 and NAND gate 51 prevents the clocking signals from being coupled to line 50 unless the disc is up to speed. The motor timer 52 controls the disc drive motor of the recorder via a signal on line 20. After data is written or read, the timer 52 prevents the disc motor from stopping for a predetermined period of time (e.g., ten seconds). Note that without this timer a considerable amount of time would be required to wait for the disc to be brought up to speed. The signals on lines 18 and 19, which are stored within the latches 42, are used to enable the recorder, including its disc motor.

In the presently preferred embodiment, the latches 42 consist of eight latches which act as a storage means and decoding means. Four lines of the address bus 14 are coupled to the latches 42. Three of these lines are used to select one of the eight latches and the remaining line is used to furnish data (binary one or zero) to the selected latch. In this manner, 8-bits of data are loaded into the latches 42. Four of these data bits are used to control the four phases of the track-select motor 33 (FIG. 1); these bits are coupled to the recorder on lines 25 through 28. Two of these data bits are coupled to lines 18 and 19 for generation of the enabling signals for the recorder. The remaining two bits are coupled to lines 60 and 61 as will be described in greater detail in conjunction with FIG. 3 to select a mode of operation for the controller.

In typical operation, the computer through the controller of FIG. 2 senses the position of the head (current track) over the disc. Specifically, the track number which is read by the head is coupled to the computer through the register 40. The computer is able to compute the ideal velocity profile for moving the head to the desired track from the current track with a relatively simple algorithm. Since all four phases of the stepping motor 33 are controlled through the latches 42, rapid acceleration and deceleration, and higher rates of rotation, are obtainable when compared to stepping the motor from track-to-track.

To achieve an efficient velocity profile for a stepping motor, the prior art often resorted to relatively complex hardware. With the latches 42 and its coupling to the computer through the address bus, an ideal velocity profile may be quickly and efficiently computed without such hardware.

Figure 3:
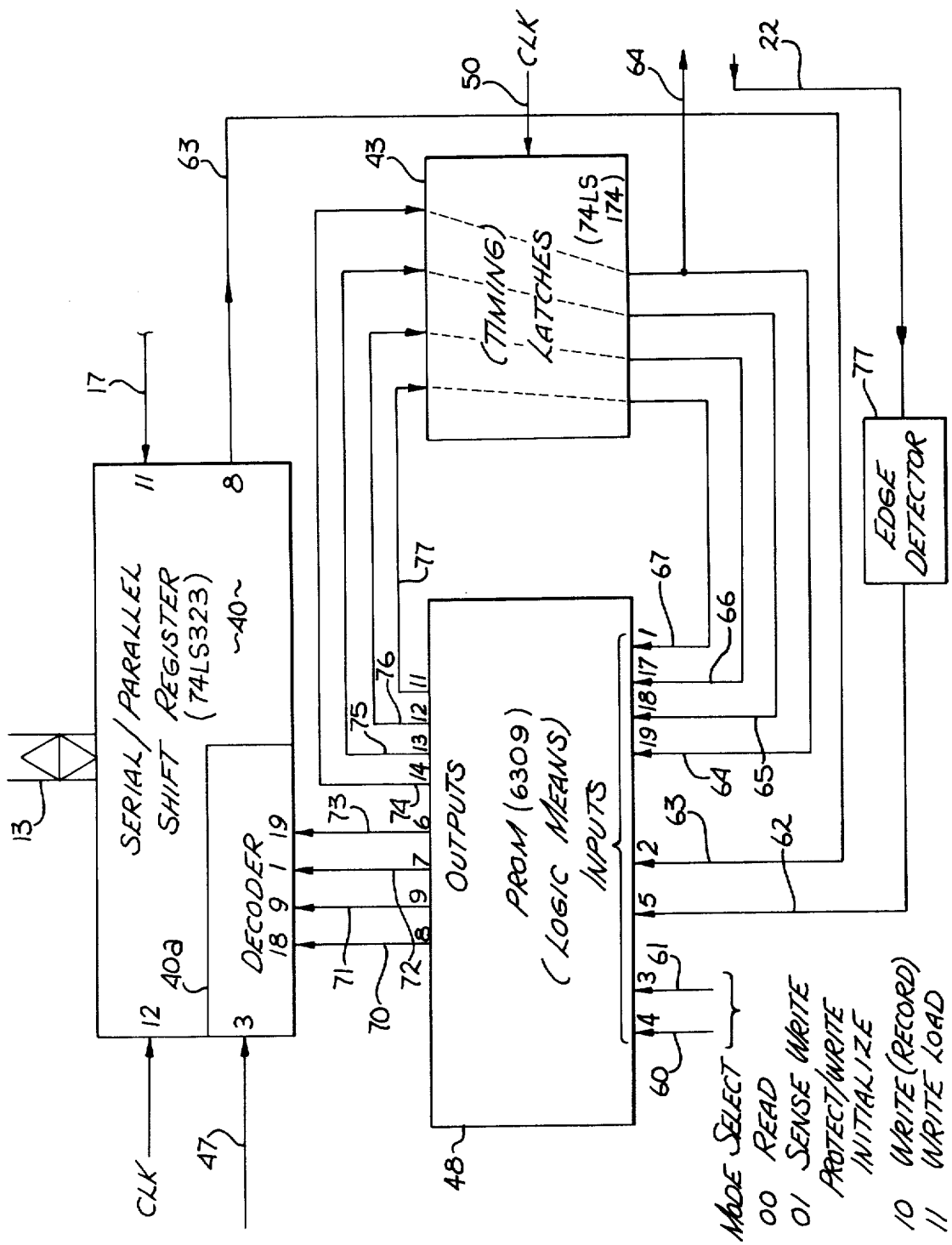
FIG. 3 is a detailed block diagram of the controller logic and timing means shown in FIG. 2.

In FIG. 3, the register 40 and the data bus 13 are again shown. The controller logic and timing means 24 of FIG. 2 comprises a logic means 48 and a timing means 43. The logic means 48 may be any logic means adaptable for receiving input signals and for providing predetermined output signals in response thereto. Thus, ordinary logic gates or other known logic arrays may be used. In the presently preferred embodiment, a read-only memory, specifically a PROM, is employed. The timing means, in the presently preferred embodiment, comprises four (4) latches which are controlled by the clocking signal, line 50.

The logic means (PROM) 48, in the presently preferred embodiment, comprises a 256-byte memory which provides an 8-bit output on lines 70 through 77 for each 8-bit address received on lines 60 through 67. The specific functions controlled by the PROM shall be discussed below. The specific program stored within the PROM 48 for the currently preferred embodiment is shown in TABLE I.

Two of the address signals to the PROM 48 are coupled from the latches 42 of FIG. 2 on lines 60 and 61. These signals select the four possible modes of operation; specifically, read (00), sense write protect/write initialize (01), write (10) and write load (11). Another input to the PROM 48, line 62, is the signal sensed by the recorder head which is coupled to the controller on line 22. An ordinary edge detector 77 is used for detecting the edge of this signal and for providing a binary signal on line 62. The input signal on line 63 is the serial output from the register 40. The remaining four address signals to the PROM 48, lines 64, 65, 66 and 67 are output signals from the latches 43.

As is apparent from FIG. 3, four of the eight bits of output from the PROM 48 provide address signals for the PROM. The signals on lines 75 through 77 provide input address signals for lines 63 through 67. One of these lines, line 64, also provides the recording signal for recording data onto the disc.

Assume that the controller is in the reading mode as determined by the 00 signal applied to the PROM 48 on lines 60 and 61. The latches 43 operate at twice the cycle rate of the microprocessor which corresponds to a rate eight times faster than the bit cell disc rate; thus the latches continually release address signals to the PROM. Initially, the register 40 is empty (all zeros). In the presently preferred embodiment, if a transition occurs on line 62 in 11 or fewer of such latch cycles, a binary one is recognized and the PROM provides an output on lines 70, 71, 72 and 73 which, after decoding by the decoder 40a, shifts a binary one in the first stage of the register 40. If twelve such cycles occur without a transition, a zero is shifted into the register 40. (As will be described later, if the first bit is a zero it will be skipped). This continues until the register is full. Counting effectively occurs by the repeated addressing of the PROM as the signals pass through the latches 43.

The computer senses a full register by polling the data bus and by specifically determining if a binary one is in the $n^{th}$ stage of the register. As mentioned, the first bit of each nibble is always a binary one. When the register is full, the computer removes the data through the data bus 13 and the register 40 is cleared. In the interim, the PROM 48 waits for a binary one and the following bit. Then it writes this binary one and the next binary bit into the register 40. The temporary delay of shifting into the register is necessary to provide ample time for the computer to withdraw the contents of the register 40. When a full register occurs, if the first bit sensed by the PROM is a zero, it is effectively skipped, although shifting a zero into the empty register would not affect the operation of the device. In this manner, nibble after nibble is read from the disc, shifted serially into the register 40 and then removed in parallel onto the data bus 13. The PROM 48 provides the logic to insure the shifting of the correct binary bits into the register 40 as a function of the signal on line 22, which is coupled to the PROM on line 62.

In the recording (writing) mode, the mode select signal (10) is applied to the PROM 48 on lines 60 and 61. (Previously, each nibble is shifted into the register 40, in parallel, from the computer during the write load mode (11).) Every eight clock cycles, the signals on lines 70 through 73 cause the register 40 to shift its contents to the right by one stage. For each such shift, the next bit in the register is coupled to line 63. The signal on line 63 determines the output signal from the PROM, and particularly, the signal on line 74 which is coupled to the recorder via line 64 after passing through latches 43. Each of the 8-bits are thus shifted from the register 40 and supplied to the recorder.

In the presently preferred embodiment, the mode select signals change to 11 for the loading of the register 40 from the data bus 13. Note that this is not necessary, and that the computer could directly communicate with the register 40 for purposes of loading data into the register.

During the sense write protect/write initialize mode, the signal on line 17 is shifted to the left by the register 40 and sensed by the computer. In this manner, the computer can determine if the particular disc on the recorder should not be written onto and provide an appropriate indication to the operator. Other data or signals may be transmitted on line 17 where appropriate.

As mentioned, in the presently preferred embodiment, a soft-sectored disc is employed. When the recorder is first selected, signals from the disc are coupled through lines 22 and 62 to the PROM 48 (reading mode). These are shifted into the register 40. One problem with a soft-sectored disc is that there is no immediate way of determining where in a nibble reading first occurred. Some means or method must be provided to align or synchronize the shifting of the data into the register 40 with the nibbles recorded on the disc.

Figure 4:
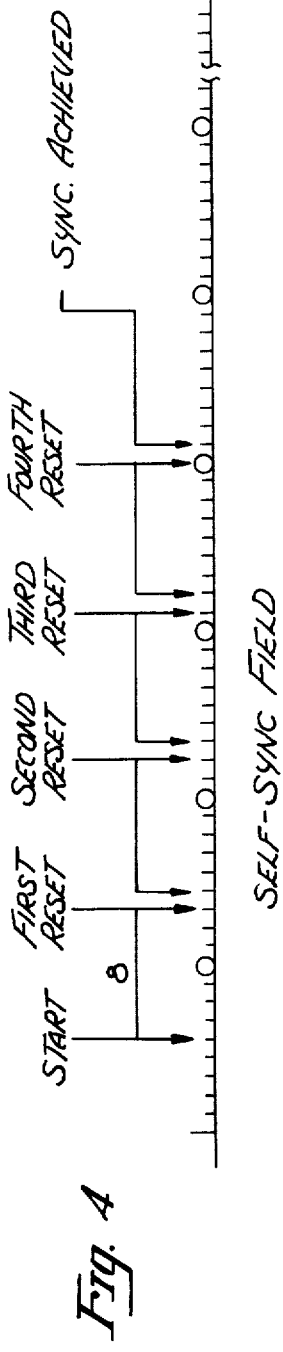
FIG. 4 is a graph of the synchronization field used to synchronize a register with recorded data.

Referring to FIG. 4, a self-synchronizing field of coded words are employed to provide synchronization. Each word consists of eight binary ones followed by a binary zero. This self-synchronization field, in a more general form, consists of n-binary ones where n corresponds to the number of stages in the register followed by at least one binary zero. As will be seen with these n+1 codes, the register 40 resets with every n bits until the first bit is a binary zero. Then the register resets with every n+1 bits.

Referring to FIG. 4, assume that the disc includes the above-described synchronization field. Assume further that reading begins where indicated by the start line. This first binary one is shifted into the register 40 of FIG. 3. Eight bits later the first reset occurs and the register automatically clears since a binary one is in the n$^{th}$ stage. Following this, eight bits later, the second reset occurs. The third reset occurs eight bits later as indicated in FIG. 4, and finally, the fourth reset occurs. (When the fourth reset occurs, a binary zero is in the first stage of the register.) From the next bit forward the register will automatically clear every n+1 bits later, and thus the register will be completely cleared when the address maker (AM$_1$) reaches the register. Likewise, if reading begins before the synchronization field, synchronization will be achieved before the end of the field.

Figure 5:
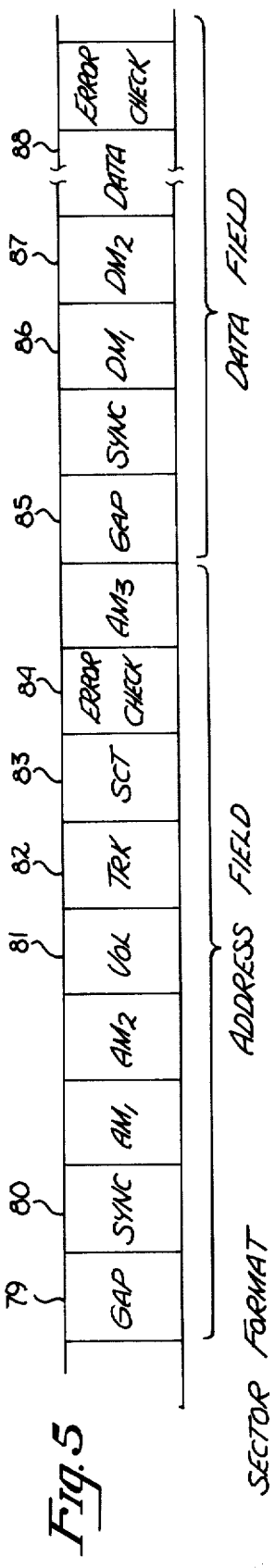
FIG. 5 is a graph illustrating the format for each sector of each track, in the presently preferred embodiment.

In the presently preferred embodiment, each of the tracks is divided into 11 sectors; one such sector is shown in FIG. 5. Each sector includes gaps, such as gap 79, to compensate for variations in the disc rate, since the disc is not always driven precisely at the same rate of rotation.

Following the gap 79, there is a synchronization field 80 which corresponds to the field shown in FIG. 4. While in theory only 8 codes of n binary ones and a binary zero are required to synchronize the register, eleven such codes are used within the synchronization field 80 to assure synchronization.

Following the synchronization field, the address marker identified as AM$_1$ appears on the track. This marker is used to indicate that an address follows. In the presently preferred embodiment, two consecutive address markers are employed as shown by AM$_1$ and AM$_2$. The address markers are distinct and immediately recognized by the computer. As previously mentioned with the normal data field and other information on the disc, every other bit is a clock bit (binary one). Thus, two binary zeros do not occur in succession. However, each marker includes both a missing clock bit and data bit. If reading beings in the middle of a data nibble, only a data bit or a clock bit may be missing, but not both. Thus, the computer cannot mistake data or other information for markers.

After the computer senses the address markers, it then knows that address information follows. Three words consisting of a volume number, a track number and a sector number (shown as words 81, 82 and 83, respectively) are read from the discs to provide an address. Following the sector number, an error check is made on the volume, track and sector numbers. In the presently preferred embodiment, an exclusive ORing of these three numbers is employed and checked with the error check word 84. A third address marker, AM$_3$, is used in the presently preferred embodiment to close the address field.

Next the data field begins, starting with a gap 85. Following the gap 85, synchronization is again required and thus a synchronization field, such as the field 80, is repeated. Two data markers 86 and 87 are used to introduce the stored data 88. In the presently preferred embodiment, 256 8-bit words (256 nibbles) are stored within data 88. Then an error check is made.

No matter where reading begins within the address field or data field of FIG. 5, synchronization is achieved before the computer accepts data. The computer will not accept any data (including addresses) unless it is preceded by a recognized marker. To recognize a marker, the marker must be properly aligned within the stages of the register 40.

By way of example, if reading begins in the middle of the volume number, the data corresponding to this number, the track number, sector number and error check will be serially moved through the register. The marker AM$_3$ will not be recognized since synchronization has not yet occurred. Following the gap 85 a synchronization field is reached and synchronization occurs. Then the data field markers DM$_1$ and DM$_2$ are recognized. However, since they were not preceded by an appropriate address marker, the data which followed is ignored. After a gap (corresponding to gap 79), a synchronization field (corresponding to synchronization field 80) is reached, and synchronization occurs. The markers AM$_1$ and AM$_2$ are recognized allowing the identification of the volume, track and sector. Then the data stored within that volume, track and sector will be read, if required.

Thus, a controller for interfacing between a digital computer and a recorder, or the like, has been described. A minimum of hardware is required to fabricate the controller. Synchronization with a soft-sectored disc is achieved without additonal hardware by reading a predetermined self-synchronization field from the disc.

TABLE I

| C700- | DA | 0D | 18 | 38 | 0A | 0A | 0A | 0A |
|---|---|---|---|---|---|---|---|---|
| C708- | 18 | 39 | 18 | 39 | 18 | 3B | 18 | 3B |
| C710- | 18 | 38 | 08 | 38 | 0A | 0A | 0A | 0A |
| C718- | 18 | 39 | 18 | 39 | 18 | 3B | 18 | 3B |
| C720- | 0D | 0D | 28 | 48 | 0A | 0A | 0A | 0A |
| C728- | 28 | 48 | 28 | 48 | 28 | 48 | 28 | 48 |
| C730- | 28 | 48 | 28 | 48 | 0A | 0A | 0A | 0A |
| C738- | 28 | 48 | 28 | 48 | 28 | 48 | 28 | 48 |
| C740- | 0D | 0D | 58 | C8 | 0A | 0A | 0A | 0A |
| C748- | 58 | 78 | 58 | 78 | 58 | 78 | 58 | 78 |
| C750- | 58 | 78 | 58 | 78 | 0A | 0A | 0A | 0A |
| C758- | 58 | 78 | 58 | 78 | 58 | 78 | 58 | 78 |
| C760- | 0D | 0D | C8 | C8 | 0A | 0A | 0A | 0A |
| C768- | 68 | 08 | 68 | 88 | 68 | 08 | 68 | 88 |
| C770- | 68 | 88 | 68 | 88 | 0A | 0A | 0A | 0A |
| C778- | 68 | 08 | 68 | 88 | 68 | 08 | 68 | 88 |
| C780- | 0D | CD | C8 | C8 | 0A | 0A | 0A | 0A |
| C788- | 98 | B9 | 98 | B9 | 98 | BB | 98 | BB |
| C790- | 98 | BD | 98 | B8 | 0A | 0A | 0A | 0A |
| C798- | 98 | B9 | 98 | B9 | 98 | BB | 98 | BB |
| C7A0- | 0D | D9 | C8 | C8 | 0A | 0A | 0A | 0A |
| C7A8- | A8 | C8 | A8 | C8 | A8 | C8 | A8 | C8 |
| C7B0- | 09 | 39 | A8 | A0 | 0A | 0A | 0A | 0A |
| C7B8- | A8 | C8 | A8 | C8 | A8 | C8 | A8 | C8 |
| C7C0- | D9 | FD | D8 | F8 | 0A | 0A | 0A | 0A |
| C7C8- | D8 | F8 | D8 | F8 | D8 | F8 | D8 | F8 |
| C7D0- | D9 | FD | D8 | F8 | 0A | 0A | 0A | 0A |
| C7D8- | D8 | F8 | D8 | F8 | D8 | F8 | D8 | F8 |
| C7E0- | 1D | DD | E8 | E0 | 0A | 0A | 0A | 0A |
| C7E8- | E8 | 88 | E8 | 08 | E8 | 88 | E8 | 08 |
| C7F0- | 1D | 6D | E8 | E0 | 0A | 0A | 0A | 0A |
| C7F8- | E8 | 88 | E8 | 08 | E8 | 88 | E8 | 08 |

I claim:

1. An interfacing means for interfacing between a digital computer and storage device such as a magnetic disc recorder, comprising:
   register means having a plurality of parallel input/output lines for coupling to said computer and a serial input/output line for coupling to said storage device, said register means also having a control means having a plurality of register control lines for controlling transfer of data to and from said register means;
   latch means having a plurality of latch input lines and a plurality of latch output lines, said latch means for controlling the flow of digital signals between latch input lines and latch output lines in response to a timing signal,
   clock means for generating said timing signal, read-only memory means having an address means with a plurality of address input lines, and a plurality of data output lines, said read-only memory means for receiving input signals on said address input lines and for providing predetermined output signals on said data output lines in response thereto;

a portion of said read-only memory means data output lines being coupled to said register control means via said register control lines for controlling data flow to and from said register, another portion of said read-only memory means data output lines being coupled to said latch means input lines, said latch means output lines being coupled to said addressing means via a portion of said read-only memory means address lines for providing a portion of an address thereto such that some of said output signals from said read-only memory means are employed as next address signals to said read-only memory means in response to said timing signal;

said interfacing means further including means for coupling the addressing means via another portion of said read-only memory means address lines to said computer whereby said computer may communicate with said storage device through said interfacing means.

2. The interfacing means defined by claim 1 including storage means for receiving digital signals from said computer and for providing control signals to said storage device for controlling track selection, said storage means being coupled to said computer and said storage device.

3. The interfacing means defined by claim 2 wherein said means for coupling the addressing means via a portion of said read-only memory address lines to said computer comprises said storage means.

4. The interfacing means defined by claim 3 wherein said input signal to said read-only memory means from said storage means is used to select a reading mode or a recording mode.

5. The interfacing means defined by claim 4 wherein said storage means comprises digital latches.

6. The interfacing means defined by claim 5 wherein said computer has an address bus and a data bus and wherein said ditigal latches are coupled to said address bus of said computer.

7. The interfacing means defined by claim 1 wherein at least one of said output signals from said read-only memory means is coupled to said storage device to provide a signal for a writing mode.

8. The interfacing means defined by claim 7 wherein said register means serially provides a digital signal on said serial input/output line as one of said address inputs to said read-only memory means during said writing mode.

9. The interfacing means defined by claim 8 wherein said output signals from said read-only memory means controls the serial loading of a digital work into said register means during a reading mode.

10. The interfacing means defined by claim 1 wherein said register means receives digital words in parallel form from said computer and serially couples said words to said read-only memory means during a writing mode.

11. The interfacing means of claim 1 wherein said several input/output line of said register means is coupled to said recorder through said latch means and said read-only memory means.

12. An interfacing means for interfacing between a digital computer and storage device such as a magnetic disc recorder, comprising:

register means having a plurality of parallel input/output lines for coupling to said computer and a serial input/output line for coupling to said storage device, said register means also having a control means having a plurality of register control lines for controlling transfer of data to and from said register means;

latch means having a plurality of latch input lines and a plurality of latch output lines, said latch means for controlling the flow of digital signals between latch input lines and latch output lines in response to a timing signal;

clock means for generating said timing signal;

read-only memory means having an address means with a plurality of address input lines, and a plurality of data output lines, said read-only memory means for receiving input signals on said address input lines and for providing predetermined output signals on said data output lines in response thereto;

a portion of said read-only memory means data output lines being coupled to said register control means via said register control lines for controlling data flow to and from said register, another portion of said read-only memory means data output lines being coupled to said latch means input lines, said latch means output lines being coupled to said addressing means via a portion of said read-only memory means address lines for providing a portion of an address thereto such that some of said output signals from said read-only memory means are employed as next address signals to said read-only memory means in response to said timing signal, said interfacing means further including means for coupling the addressing means via another portion of said read-only memory means address lines to said computer, said read-only memory means being coupled to receive a data signal from said storage device as an address input on one of said address input lines during reading of data, said read-only memory means being coupled to said serial input/output line of said register means to receive a data signal from said register means as an address input on another of said address input lines, and one of said read-only memory data output lines being coupled to said storage device to provide a data signal thereto during recording of data, whereby said computer may communicate with said storage device through said interfacing means.

13. The interfacing means defined by claim 12 wherein said control signal for said latching means comprises a synchronization signal from said computer.

14. The interfacing means defined by claim 12 including storage means coupled to said computer, said read-only memory means and said storage device for receiving signals from said computer for controlling track selection by said storage device and for selecting said recording or reading of data.

* * * * *